INVENTOR
JOSEPH B. ARMITAGE
BY W. D. O'Connor
ATTORNEY

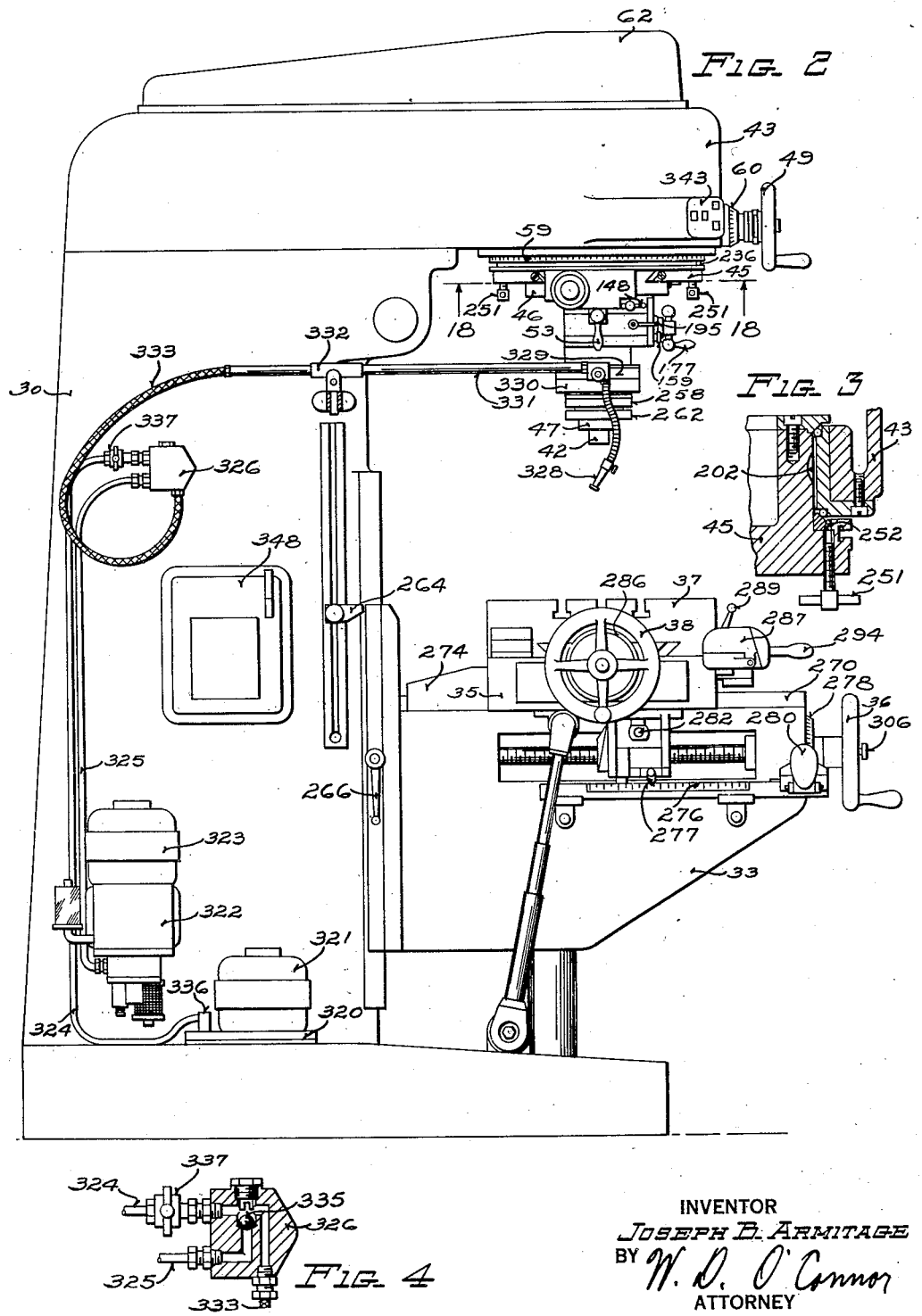

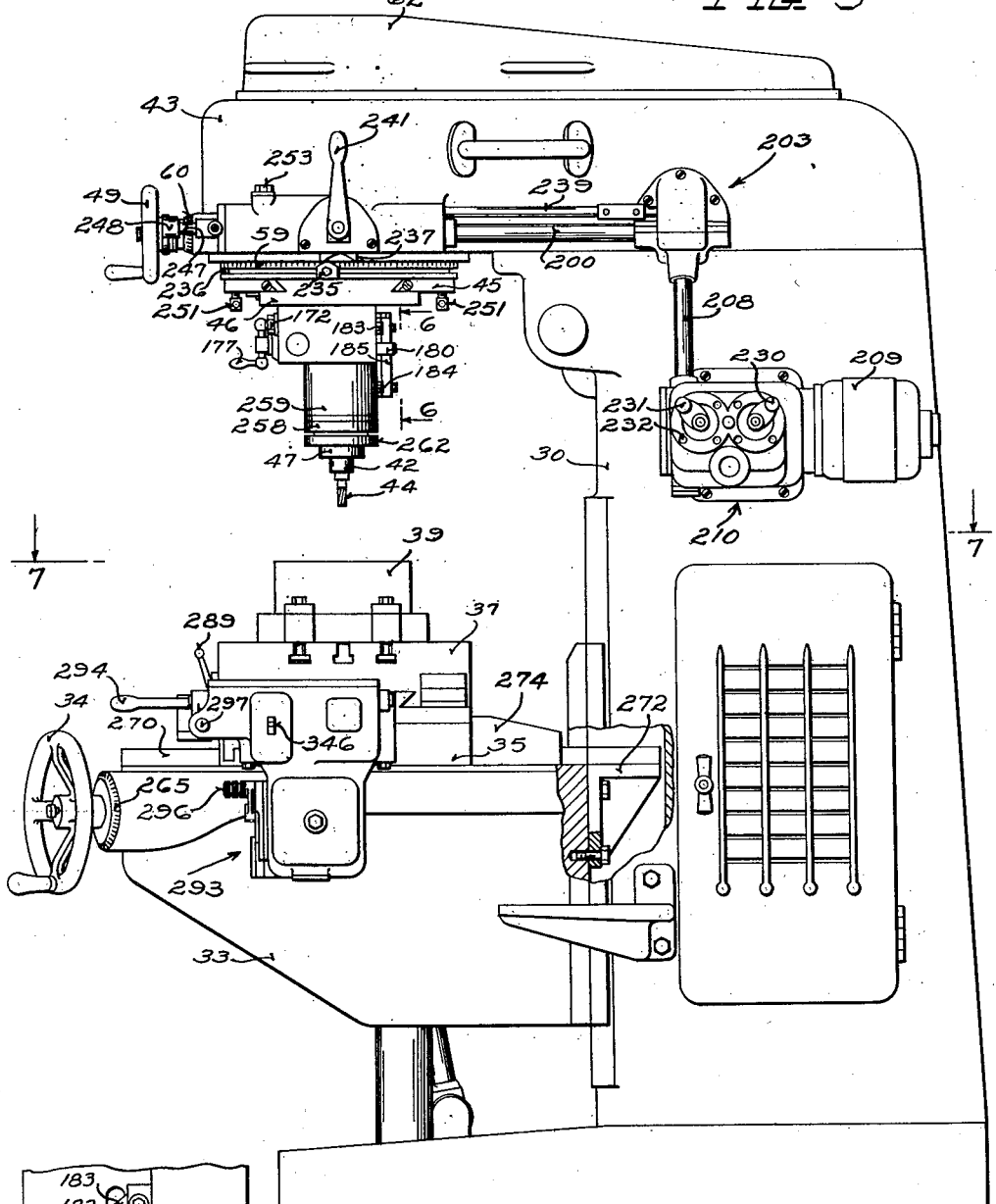

July 3, 1945.    J. B. ARMITAGE    2,379,405
MILLING MACHINE
Filed July 14, 1939    9 Sheets-Sheet 4
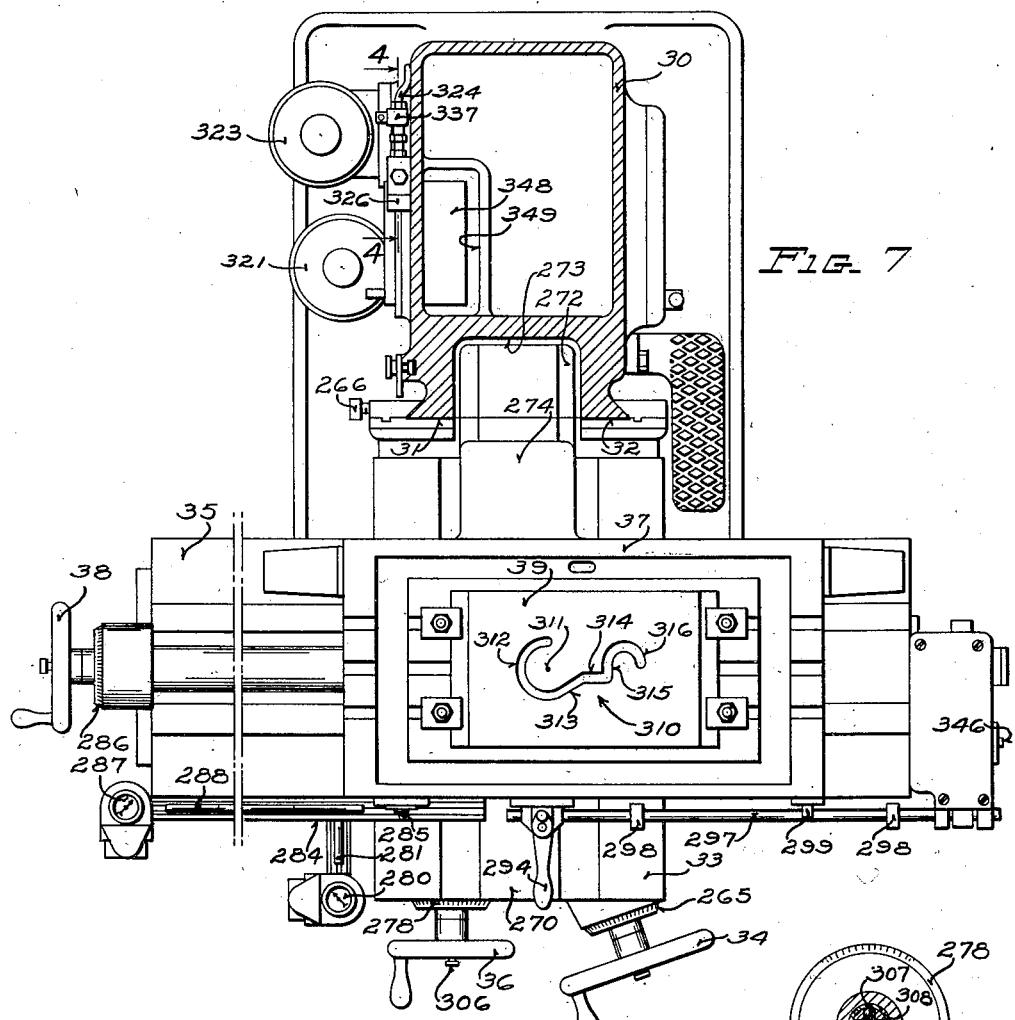
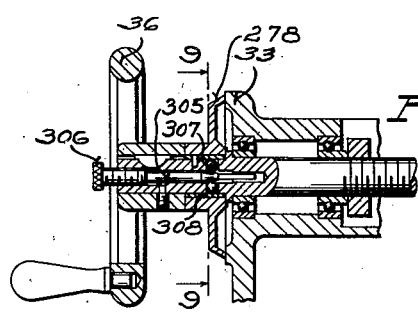
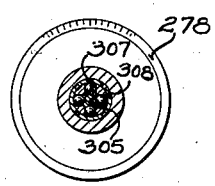
INVENTOR
JOSEPH B. ARMITAGE
BY W. D. O'Connor
ATTORNEY

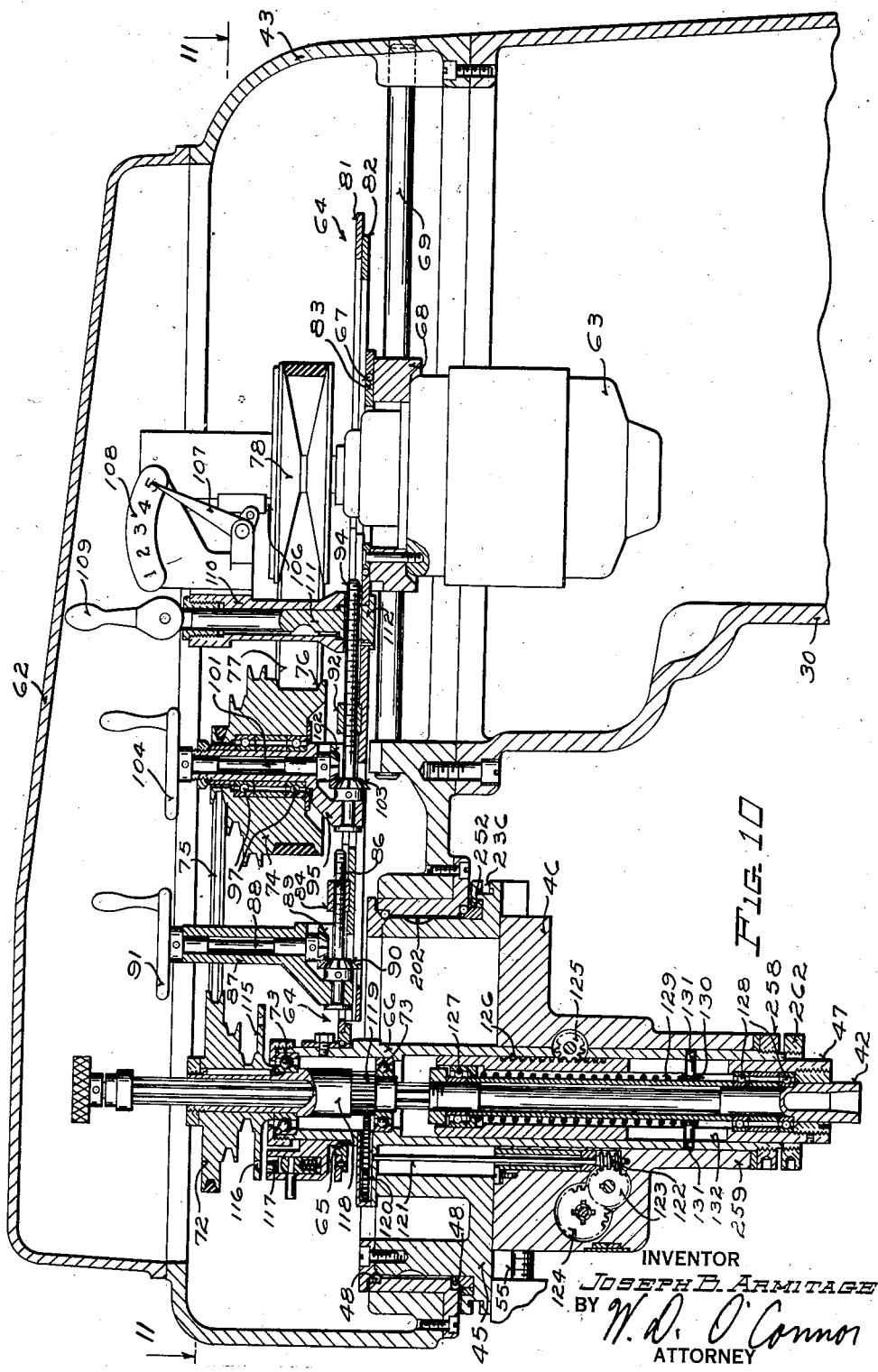

July 3, 1945.  J. B. ARMITAGE  2,379,405
MILLING MACHINE
Filed July 14, 1939  9 Sheets-Sheet 6
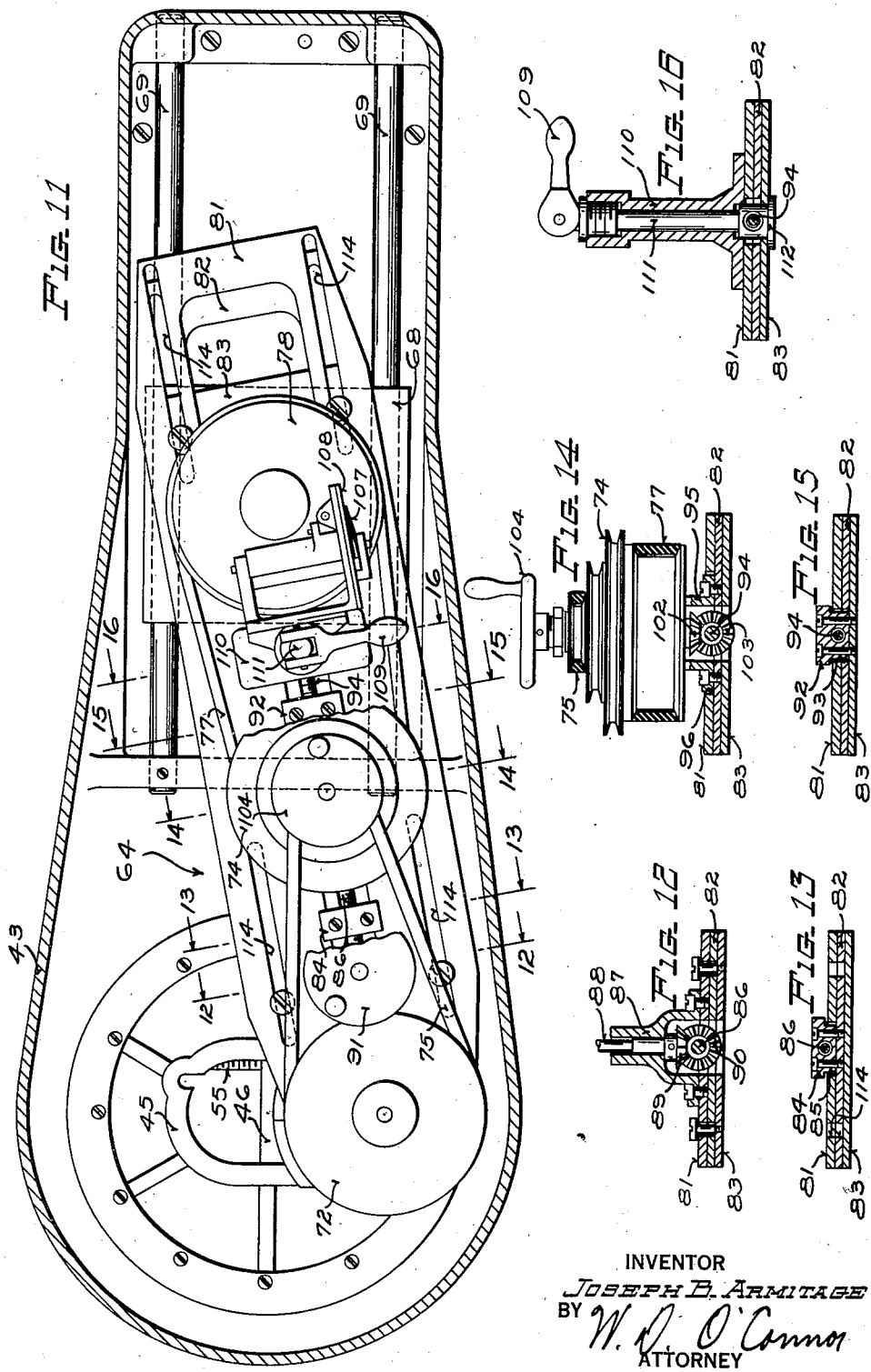
INVENTOR
JOSEPH B. ARMITAGE
BY W. D. O'Connor
ATTORNEY

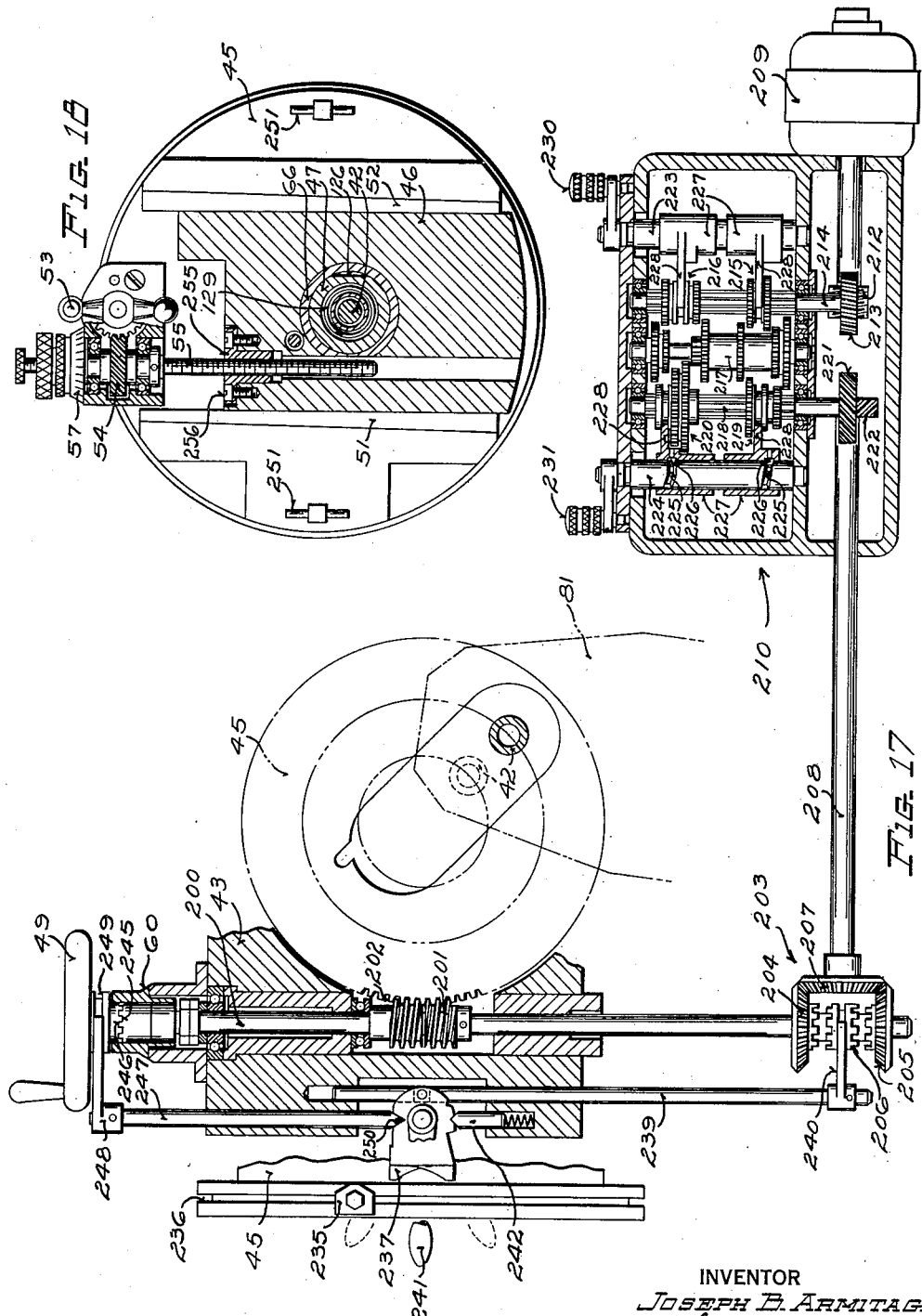

July 3, 1945. J. B. ARMITAGE 2,379,405
MILLING MACHINE
Filed July 14, 1939 9 Sheets-Sheet 8

INVENTOR
JOSEPH B. ARMITAGE
BY W. D. O'Connor
ATTORNEY

July 3, 1945.   J. B. ARMITAGE   2,379,405
MILLING MACHINE
Filed July 14, 1939   9 Sheets-Sheet 9

INVENTOR
JOSEPH B. ARMITAGE
BY W. D. O'Connor
ATTORNEY

Patented July 3, 1945

2,379,405

UNITED STATES PATENT OFFICE 2,379,405

MILLING MACHINE

Joseph B. Armitage, Wauwatosa, Wis., assignor to Kearney & Trecker Corporation, West Allis, Wis., a corporation of Wisconsin Application July 14, 1939, Serial No. 284,387

30 Claims. (Cl. 90—15)

This invention relates generally to machine tools and more particularly to an improved milling machine adapted to perform intricate machining operations with facility and with a high degree of accuracy.

A general object of the invention is to provide an improved milling machine especially adapted to machine articles of intricate shapes such as dies or the like;

Another object of the invention is to provide an improved milling machine capable of producing directly and with a high degree of precision, articles including various arcuate and angularly disposed elements of predetermined dimensions arranged in accurately established relationship;

Another object is to provide an improved milling machine capable of effecting angular and circular or arcuate machining operations upon a workpiece at various predetermined positions thereon without resetting the workpiece in the machine;

Another object is to provide improved supporting means for a machine tool spindle;

Another object is to provide an improved milling machine having a rotary tool supporting spindle mounted for gyratory bodily movement;

Another object is to provide improved driving mechanism for imparting axial feeding movement to a gyratory machine tool spindle;

Another object is to provide an improved power transmitting mechanism for rotating a bodily movable spindle of a machine tool;

Another object is to provide an improved oscillatory supporting structure for carrying the power transmitting mechanism connected to drive a bodily movable machine tool element;

Another object is to provide an improved coolant fluid supply system for a machine tool;

A further object is to provide an improved system for supplying coolant liquid or air or a mixture of liquid and air to the cutter of a machine tool.

According to this invention, a milling machine particularly adapted to perform intricate machining operations on dies and the like, is provided with a work-supporting table and a cooperating tool supporting spindle mounted for gyratory bodily movement relative to the table. The tool supporting spindle is preferably disposed vertically and is carried by a rotatably mounted head in which it is arranged for radial adjustment to position it for effecting arcuate movement along paths of different radii. The spindle is also arranged for axial feeding movement and it may be moved laterally along any predetermined angularly disposed path by setting the rotary head at the required angle, the work-supporting table being movable in the usual manner along three mutually transverse paths for positioning the work relative to the spindle. The spindle is driven by a motor mounted in the machine frame independently of the rotatable head, the motor being operatively connected to the spindle by an improved speed changing belt transmission mechanism. To accommodate the bodily movement of the spindle, the driving motor and the speed changing transmission mechanism are carried bodily by an oscillating platform one end of which moves with the spindle while the other end is slidably mounted in the frame, the action of the platform being similar to that of a connecting rod. The rotary spindle carrying head is mounted in preloaded ball bearings and is arranged to be power driven by means of a selective speed changing and reversing mechanism which is provided with a tripping device for stopping the head in predetermined positions. Improved means are provided for supplying either coolant liquid or air to a cutter in the bodily movable spindle at any position assumed by it.

The invention is exemplified herein by means of a milling machine of special construction embodying the inventive features. However, it is to be understood that this particular embodiment is intended to be illustrative only and that various other types of machine tools incorporating different structural details coming within the range of equivalents of the features defined in the subjoined claims, may be utilized in practicing the invention.

The foregoing and other objects of this invention, which will become more fully apparent from the following detailed specification, may be achieved by the exemplifying machine tool depicted in and described in connection with the accompanying drawings, in which:

Fig. 2 is a general view in left side elevation of the machine shown in Fig. 1;

Fig. 3 is an enlarged detail sectional view, taken in vertical section on the plane represented by the line 3—3 in Fig. 1 and showing the rotary head locking means;

Fig. 4 is another enlarged detail view, taken in vertical section along the line 4—4 of Fig. 7 and showing the coolant controlling valve;

Fig. 5 is a general view in right side elevation of the machine tool shown in Figs. 1 and 2;

Fig. 6 is an enlarged detail view of trip mechanism for the spindle quill feeding apparatus, taken in the direction of the arrows 6—6 in Fig. 5;

Fig. 7 is a plan view, partly in horizontal section along the line 7—7 in Fig. 5, showing the work supporting structure of the machine and an illustrative workpiece;

Fig. 8 is an enlarged detail view in horizontal section, taken along the line 8—8 in Fig. 1 and showing the position indicating dial adjusting means;

Fig. 9 is another detail view of the dial adjusting means, taken in transverse vertical section along the line 9—9 in Fig. 8;

Fig. 10 is a view in vertical section, taken longitudinally through the upper portion of the machine on the plane represented by the line 10—10 in Fig. 1;

Fig. 11 is a plan view, partly in horizontal section taken along the line 11—11 in Fig. 10, showing the spindle driving transmission mechanism in the machine head;

Fig. 12 is a fragmentary detail view in vertical section, taken on the line 12—12 in Fig. 11 and showing part of the belt tensioning means;

Fig. 13 is a detail sectional view of another part of the belt tensioning means, taken along the line 13—13 in Fig. 11;

Fig. 14 is a detail sectional view of part of a belt adjusting mechanism, taken along the line 14—14 in Fig. 11;

Fig. 15 is a detail sectional view of another part of the belt adjusting mechanism, taken along the line 15—15 in Fig. 11;

Fig. 16 is a detail view in vertical section of clamping means for the belt tensioning and speed adjusting mechanisms, taken along the line 16—16 in Fig. 11;

Fig. 17 is a diagrammatic view largely in section, of the power transmission mechanism for revolving the spindle carrying rotary head of the machine;

Fig. 18 is a view of the rotary head and the spindle supporting slide, taken largely in horizontal section along the line 18—18 in Fig. 2, looking upward;

Figure 1:
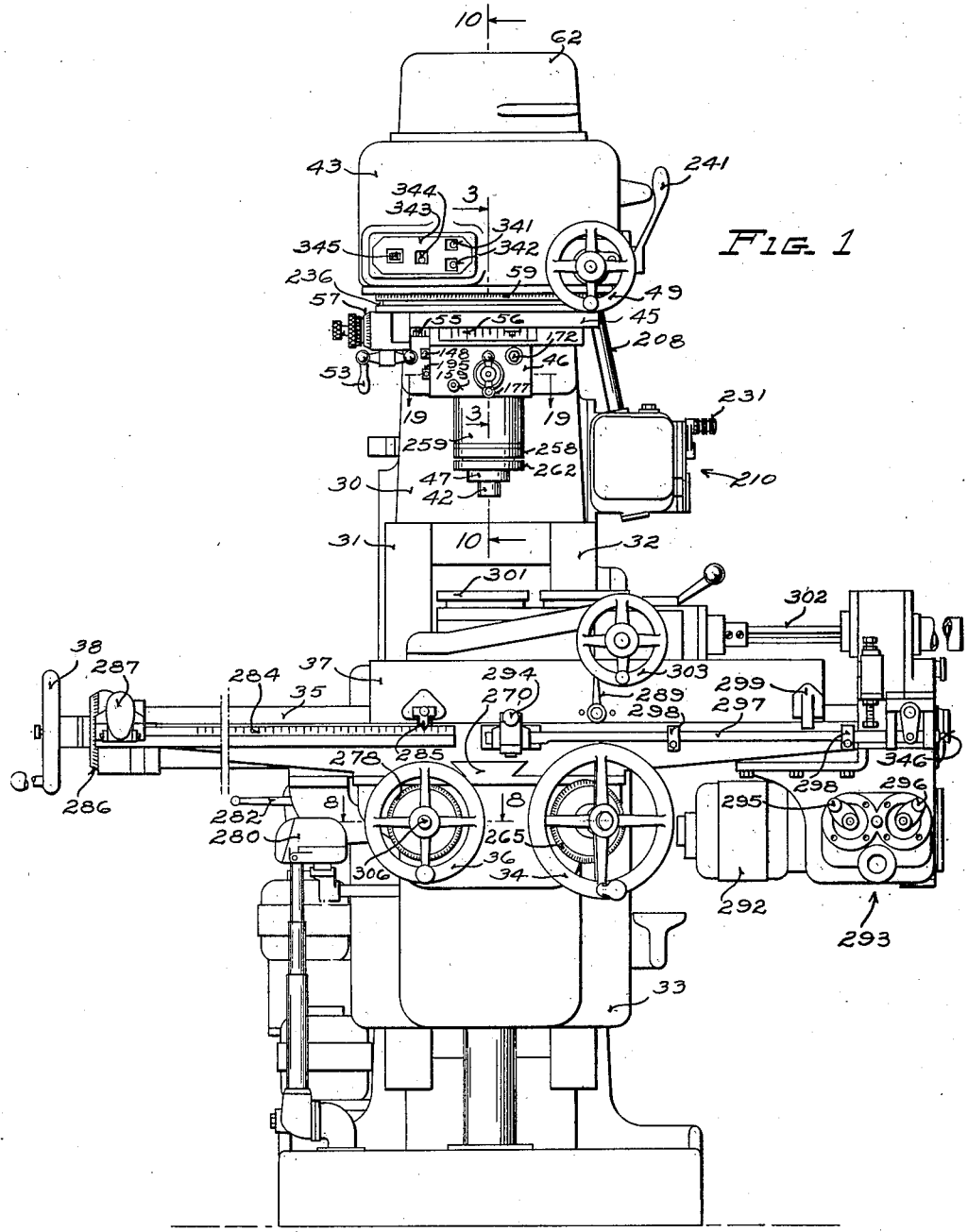
Figure 1 is a general view in front elevation of an improved milling machine embodying the novel features of the present invention.

The particular machine tool shown in the drawings as exemplifying structure constituting a preferred embodiment of the invention, is generally similar in character, particularly as to the work supporting portions thereof, to a knee and column type milling machine, although it is to be understood that the various novel features of the invention may be incorporated in machine tools of other types and of different construction with equal advantage.

Referring more specifically to the drawings, the improved milling machine there illustrated is fully described in the following parts of this specification by way of a complete disclosure of an operative embodiment of the present invention. As shown in the general views in front and side elevation, Figs. 1, 2 and 5, the machine comprises a base and upstanding column member 30 constituting the main frame or supporting element and carrying cooperating work-supporting and tool supporting members. As best shown in Fig. 1, the column 30 is provided on its forward face with spaced vertical ways 31 and 32 constituting bearing surfaces for guiding a vertically adjustable work supporting structure including a knee 33 that slidably engages the ways and that may be adjusted along them by actuating a handwheel 34 at the front of the knee. On the top of the knee 33 there is slidably mounted a saddle 35, arranged for transverse movement toward or from the column by actuating a handwheel 36 also disposed at the front of the knee. The saddle 35 supports, in turn, a horizontal work carrying table 37 arranged for longitudinal movement parallel with the face of the column, a handwheel 38 being provided at the left end of the saddle for actuating the table. By manipulating the three handwheels, a workpiece 39 carried by the table 37 may be adjusted in three mutually transverse planes to any desired position within the range of the machine.

Above the work carrying table 37, a vertically disposed tool carrying spindle 42 is mounted for bodily gyratory movement in cooperating relationship with the workpiece 39. As shown in Fig. 5, the tool spindle 42 depends from a forwardly projecting supporting structure or machine head 43 constituting a superstructure mounted on the top of the column 30, in position to present a milling cutter 44 in cooperating relationship with the workpiece 39 on the table 37. As best shown in Figs. 10 and 18, the tool spindle 42 is carried in a rotatable supporting head 45 by means of a radially adjustable transverse slide 46 that supports an axially adjustable quill 47 within which the spindle is rotatably mounted. The rotatable head 45 is preferably carried in the forwardly projecting superstructure 43 by means of preloaded ball bearings 48, and it may be turned manually by means of a handwheel 49 to move the eccentrically disposed spindle 42 through a circular or arcuate path of radius determined by the position of the radially movable cross slide 46 to effect gyratory machining operations in the manner more fully set forth and claimed in Reissue Patent No. 20,893, to Howard W. Bartholomew, entitled Milling machine.

As best shown in Fig. 18, the radial cutter supporting slide 46 is fitted in the rotary head 45 by means of a pair of tapered gibs 51 and 52 engaging the respective sides thereof in such manner that the position of the spindle 42 relative to a diametral line of the head 45 may be adjusted by moving the slide 46 transversely. This is effected by loosening one gib and then tightening the other gib to position the slide precisely for movement of the spindle accurately along the diametral line.

The spindle carrying slide 46 may be adjusted radially of the head 45, along the diametral line, by turning a depending hand crank 53 that is connected by helical gearing 54 with an actuating screw 55, the radial position of the spindle being indicated by means of a scale 56, shown in Fig. 1, that is read in conjunction with a dial 57 adjustably secured on the end of the screw 55.

With the spindle 42 set at a predetermined radial position, the head 45 may be rotated to move the cutting tool 44 in manner to machine an arcuate or circular form upon the workpiece 39 at any position upon its surface, determined by the longitudinal and transverse adjustment of the table 37 and the saddle 35. Likewise, linear cutting movements at any predetermined angle may be effected by setting the rotary head 45 to position the cross slide 46 at the predetermined angle, as indicated by a scale 59 on the head and a cooperating micrometer scale 60 associated with the handwheel 49, the slide 46 then being fed along the angular path by turning its actuating handcrank 53. The various angular and arcuate cutting movements may be correlated to form the desired contours upon the workpiece 39 in predetermined relationship by suitably positioning the workpiece 39. This is accomplished by means of the saddle and table moving handwheels 36 and 38, respectively, as is more fully explained in the previously mentioned patent.

The mechanism for rotating the spindle 42 to drive the milling cutter 44, is mounted within the forwardly projecting machine head 43 and is made accessible by opening a hinged cover 62 at the top of the machine. As shown in Fig. 10, the source of power for driving the spindle 42 is an electrical motor 63 slidably mounted in the supporting superstructure 43 independently of the rotating head 45. An improved power transmission mechanism is provided for transmitting power from the motor 63 in the machine frame to the spindle 42 in the rotary head 45 to drive it at selected speed in whatever position the spindle may assume in its gyratory movement resulting from turning the head. For this purpose, the driving motor 63 and the power transmission mechanism are carried by an oscillating platform structure 64 which is pivotally connected at one end concentric with the spindle 42 and is pivotally and slidably supported at its other end within the rear part of the housing 43 at the top of the column 30, the arrangement being such that the platform moves in the manner of a connecting rod structure of the type used in reciprocating engines. As shown in Fig. 10, the forward end of the platform 64 is rotatably mounted by means of ball bearings 65 on a sleeve 66 that is fixed in the radial slide 46 and constitutes the guiding structure for the vertically movable spindle supporting quill 47. At its other or inner end, the platform 64 is pivotally mounted by means of ball bearings 67 upon a supporting block or cross head 68 that is slidably mounted for movement toward or from the front of the machine upon a pair of parallelly disposed guide rods 69 fixed in the supporting structure 43, as best shown in Figs. 10 and 11. As shown in Fig. 10, the motor 63 is carried by the cross head 68 with its shaft concentric with the bearing 67 and with its frame depending into the top of the hollow column 30. By this arrangement, the motor 63 is supported in the machine frame in such manner that the relationship between the shaft of the motor and the spindle 42 is maintained constant by the interconnecting linkage or platform structure during rotary movement of the head 45 in imparting gyratory action to the spindle.

In order to provide for adjusting the speed of rotation of the spindle 42, the spindle is driven by a cone or step pulley 72 that is rotatably mounted on the upper end of the sleeve 66 by means of ball bearings 73 and is arranged to have sliding connection with the spindle 42 to permit axial feeding movement thereof. A complementary cone pulley 74 is rotatably supported near the middle of the platform 64 and is connected by means of a V-belt 75 to the pulley 72, the arrangement being such that the belt may be moved to any one of three pairs of aligned belt grooves in the cooperating pulleys in manner to provide three ranges of speed of operation for the spindle 42.

The intermediate pulley 74 has formed integrally with it an additional belt groove or single pulley 76 for receiving a relatively wide V-belt 77 that operates over it and an adjustable or expansible V-pulley 78 fixed on the shaft of the driving motor 63, the arrangement being such that the driving ratio between the adjustable pulley 78 and the belt groove 76 of the pulley 74 may be varied through infinitely small steps throughout each of the ranges established by the cooperating cone pulleys 72 and 74, thereby providing for infinite variation in the speed of the spindle 42 throughout its entire speed range.

In order to provide for adjusting the tension of the belt 75 and for adjusting the position of the belt 77 in the groove of the adjustable pulley 78, the oscillating platform 64 is made up of three superimposed relatively slidable plates or struts, an upper plate 81 which carries the bearing 65 constituting the rotatable connection with the spindle 42, an intermediate plate 82 which carries the intermediate pulley 74, and a lower plate 83 which carries the bearing 67 constituting the pivotal connection with the sliding cross head 68. To provide for adjusting the tension of the belt 75 or to loosen it for changing its position upon the cone pulleys 72 and 74, a screw and nut mechanism is arranged to effect sliding movement between the upper plate 81 and the intermediate plate 82. As best shown in Fig. 13, the intermediate plate 82 has secured to it a nut element 84 arranged for sliding movement in a groove or slot 85 in the upper plate 81. The nut 84 cooperates with a screw 86 which is rotatably mounted in a bracket 87 secured to the top plate 81, as best shown in Fig. 12. The bracket 87 carries a vertically disposed rotatable control shaft 88 that is provided at its lower end with a bevel pinion 89 meshing with a similar pinion 90 fixed on the screw 86. For actuating the belt tightener, the shaft 88 is provided at its upper end with a handwheel 91 by means of which it may be rotated to turn the screw 86 within the nut 84 for effecting sliding movement of the intermediate plate 82 relative to the top plate 81.

Likewise, the lower plate 83 may be moved relative to the intermediate plate for the purpose of adjusting the position of the belt 77 within the expansible pulley 78 to change the transmission ratio. For this purpose, the lower plate 83 has secured to it a nut element 92 arranged for sliding movement in slots 93 in the plates 81 and 82, as shown in Fig. 15. A screw 94 cooperating with the nut 92, is rotatably mounted in a bracket 95 that is secured to the intermediate plate 82 as best shown in Fig. 14, and arranged for sliding movement in a slot 96 in the top plate 81. As shown in Fig. 10, the bracket 95 also constitutes the supporting journal for the intermediate multiple pulley 74 which is mounted thereon by means of spaced ball bearings 97. Within the bracket 95 there is journalled a vertically disposed control shaft 101 which extends through the pulley 74 and is provided at its lower end with a bevel pinion 102 that meshes with a similar pinion 103 fixed on the adjusting screw 94. At its upper end, the control shaft 101 is provided with a handwheel 104 which may be rotated to turn the screw 94 for effecting sliding movement of the lower plate 83 relative to the intermediate plate 82 in manner to change the position of the belt 77 in the groove of the adjustable pulley 78 for adjusting the driving ratio between the motor 63 and the intermediate pulley 74.

To indicate the driving ratio, the pulley 78 is provided with indicating mechanism including a shoe 106 disposed to engage one face of the pulley and arranged for vertical sliding movement with it when the belt position is changed. The shoe 106 is pivotally connected to one arm of an indicating bell crank 107 in manner to move the other arm thereof relative to an indicating scale 108, upon expansion or contraction of the pulley. By noting the indication on the scale 108 and the position of the V-belt 75 on the cone pulleys, and then referring to a speed chart furnished for the purpose, the speed of rotation of the spindle 42 may be determined.

After the sliding plates have been moved to adjusted position, all three plates may be clamped together to constitute a substantially rigid platform, by actuating a clamping lever 109 on a bracket 110 resting on the top plate 81. As shown in Fig. 16, the clamping lever 109 is pivoted upon the upper end of a shaft 111 that is provided at its lower end with a shoe 112 fixed in the lower plate 83, the lever having a cam element which bears upon he top of the bracket 110 in manner to draw upward upon the shaft 111 in effecting the clamping action. The three plates are maintained in alignment by means of four guide pins or screws arranged in pairs near the respective ends of the platform and fixed in the lower plate 83 as shown in Fig. 12, the upper and intermediate plates being provided with slots 114 that receive the screws to permit the relative longitudinal sliding movement.

Whenever either the handwheel 91 or the handwheel 104 is manipulated to effect relative sliding movement of the plates or struts, the distance between the spindle 42 and the driving motor 63 is altered, but since the motor is slidably carried on the guide rods 69, the change in length of the connecting rod or platform structure does not interfere with its oscillatory operation but merely causes the motor to assume a slightly different position upon the guide rods.

In order to lock the spindle 42 in stationary position for changing the cutter, or the like, there is provided adjacent to the cone pulley 72 and preferably formed integrally with it, a locking plate 115 having a plurality of holes 116 disposed in a circle. The holes 116 are arranged in such manner that any one of them may be engaged by a spring pressed locking plunger or pin 117 carried by a bracket fixed on the sleeve 66, the arrangement being such that the pin may be locked in retracted or disengaged position when it is desired to operate the spindle.

Axial feeding movement of the quill 47 and the spindle 42 may be effected manually or by feeding mechanism deriving power from the rotating spindle and arranged to move the quill axially at a rate having predetermined relationship to the speed of rotation of the spindle. As shown in Fig. 10, the spindle driving cone pulley 72 is keyed to a sleeve 118 which is rotatably supported by the ball bearings 73 and is provided with internal splines that slidably receive cooperating external splines on the spindle 42 to provide for relative longitudinal sliding movement therebetween. For supplying feeding power, the sleeve 118 is provided at its lower end with a toothed gear portion 119 that meshes with a complementary gearwheel 120 fixed on the upper end of a vertical shaft 121 journalled in the radial slide 46. The shaft 121 is provided at its lower end with a worm 122 that engages a wormwheel 123 which drives a rate changing and reversing mechanism 124 mounted in a housing depending from and constituting part of the slide 46. The rate changing mechanism 124 is operative, in manner more fully described hereinafter, to turn a pinion 125 in the desired direction and at predetermined rate, the pinion having meshing engagement with a rack 126 formed in the quill 47 in manner to move it and the spindle 42 up or down within the sleeve 66.

The spindle 47 is journalled in the quill by means of upper and lower preloaded thrust resisting ball bearings 127 and 128, in manner to move vertically with the quill. Upward movement of the quill is facilitated by a concentric counter-balancing spring 129 that exerts force upward against the upper ball bearing structure 127 and is supported at its lower end by means of a collar 130 encircling the spindle and supported in fixed vertical position by pins 131 mounted in the fixed sleeve 66 and passing through slots 132 in the vertically movable quill 47.

Figures 19, 20:
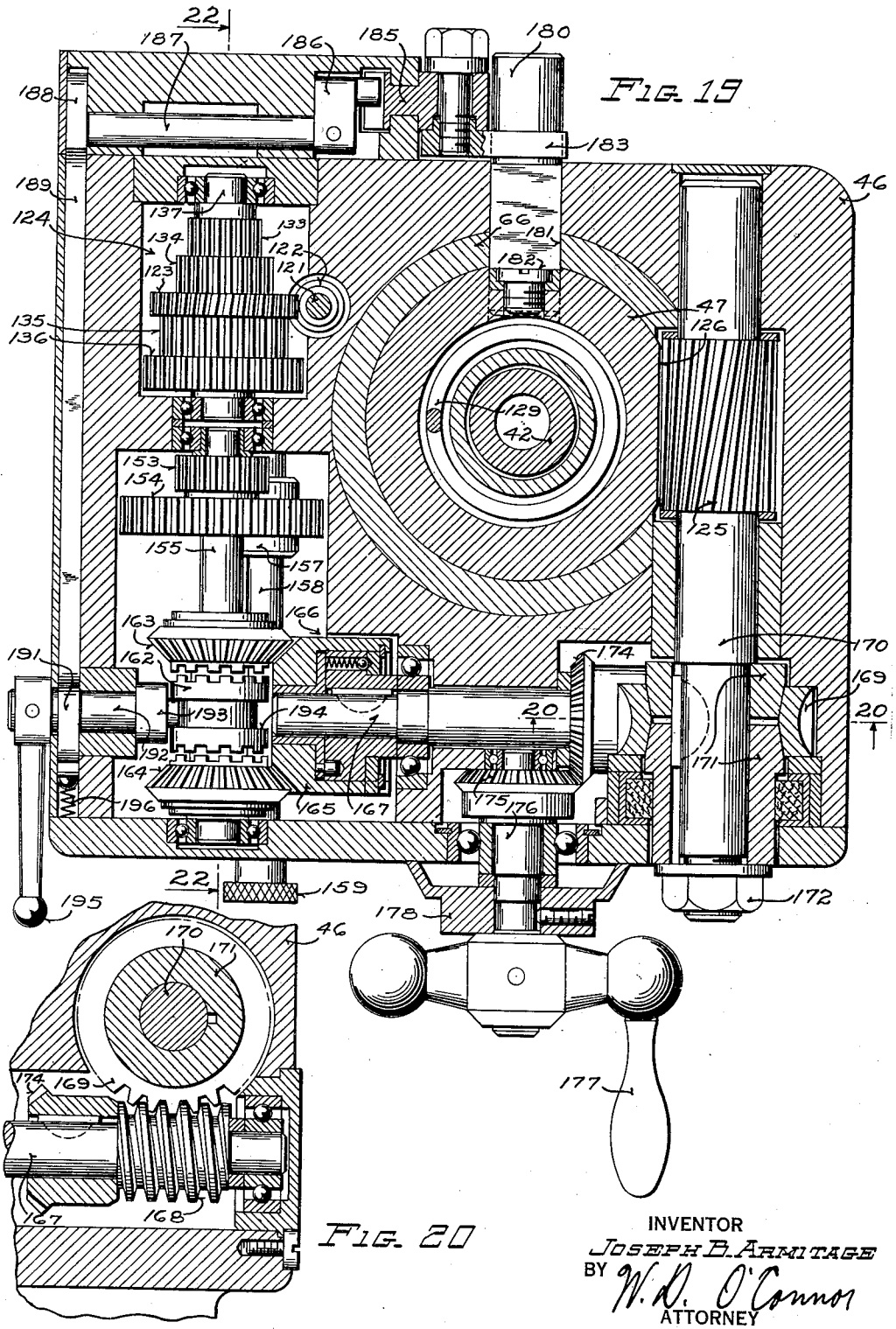
Fig. 19 is an enlarged view of the spindle quill feeding mechanism, taken in horizontal section on the plane represented by the line 19—19 in Fig. 1.
Fig. 20 is a fragmentary detail view of the quill feeding pinion driving gear taken in vertical section along the line 20—20 in Fig. 19.
Figure 22:
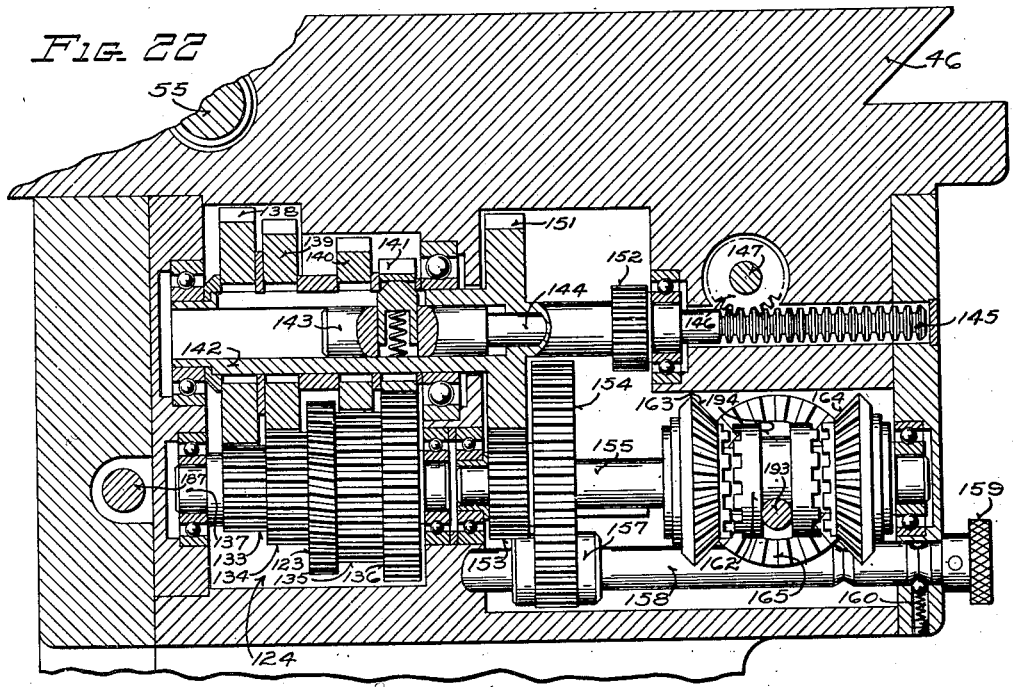
Fig. 22 is a view of the spindle feeding mechanism, generally similar to Fig. 21 but taken in vertical section along the line 22—22 in Fig. 19.
Figure 21:
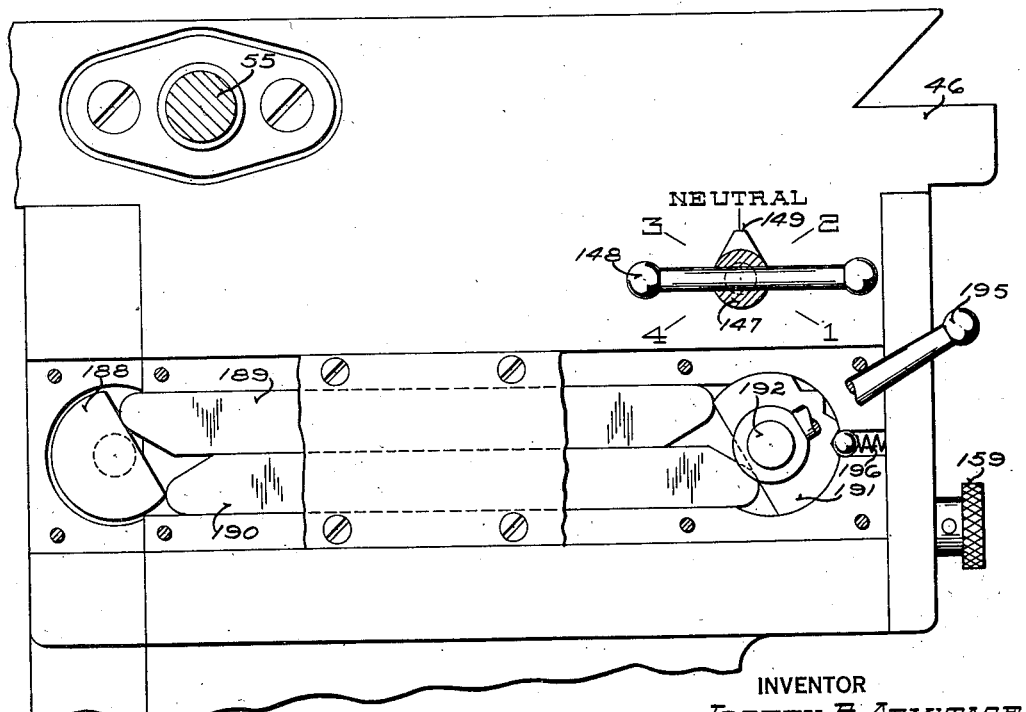
Fig. 21 is an enlarged fragmentary view in elevation of the spindle quill feeding and control mechanism, as it appears in Fig. 2.

Referring now to Figs. 19 and 22 showing the quill driving rate changing and reversing mechanism 124 in section and enlarged, it appears that the wormwheel 123, which is driven by the worm 122 on the vertical shaft 121, has fixed with it four gear wheels 133, 134, 135 and 136 of different diameters, the gear wheels being rotatably supported as a unit by means of a stub shaft 137 journalled in the housing. The four gear wheels mesh respectively with complementary gear wheels 138, 139, 140 and 141 each of which is rotatably mounted independently on a hollow shaft 142 journalled in the housing parallel with the shaft 137, as best shown in Fig. 22. Within the hollow shaft 142 is slidably mounted a keying member 143 arranged to be moved axially therein and adapted to cooperate selectively with keyways in the four gears for engaging and locking any one of them to the shaft. The keying member 143 is provided with an extending control rod 144 that projects from the end of the hollow shaft 142 and is provided with a circular rack portion 145 that is engaged by a meshing pinion 146. The pinion 146 is carried on a rocking shaft 147 that projects from the housing, as appears in Figs. 2 and 21, and is provided at its outer end with an actuating handle 148. By moving the handle 148, the shaft 147 may be turned to any one of four active positions indicated by a pointer 149 thereon, or to a central neutral position, as shown in Fig. 21, to move the keying member 143 in manner to lock any one of the gear wheels 138, 139, 140 or 141 to the shaft 142. This results in the shaft 142 being driven selectively at any one of four speeds relative to the speed of the shaft 137 and the speed of the driving tool spindle 42.

As shown in Fig. 22, the hollow shaft 142 has fixed upon it a relatively large gear wheel 151 and a relatively small gear wheel 152 which are adapted to be engaged selectively by a complementary small gear wheel 153 and large gear wheel 154, respectively, fixed together to constitute a couplet which is slidably keyed on a parallel shaft 155. The shiftable gear couplet on the shaft 155 and the cooperating gears on the shaft 142 constitute a range changing mechanism by means of which the shaft 155 may be driven in either a high range or a low range to provide, in combination with a shiftable keying member 143, a total of eight speed changes for the shaft 155. As shown, the large gear wheel 154 of the sliding couplet is engaged by a shifting fork 157 that is fixed on a shifting rod 158 which projects from the casing and is provided on its projecting end with a pull knob 159 whereby the couplet may be moved to either of its two positions, a spring pressed detent mechanism 160 being provided for engaging cooperating grooves in the rod to retain it in either position. By manipulating the shifting handle 148 and the pull knob 159 in coordinated relationship, the transmission mechanism 124 may be caused to transmit power from the hollow shaft 142 to the parallel shaft 155 at any one of eight speed ratios.

The shaft 155 has slidably keyed thereon a reversing clutch spool 162 arranged to be moved from a central neutral position in either direction to engage its clutch teeth with complementary teeth of a pair of reversing clutch bevel pinions 163 and 164 that are rotatably mounted on the shaft 155 at opposite sides respectively of the clutch spool 162. The reversing bevel pinions 163 and 164 both mesh with a similar cooperating bevel pinion 165 that is operatively connected, as shown in Fig. 19, by means of a torque limiting device 166, to a shaft 167 disposed in the housing at right angles to the shaft 155. As best shown in Fig. 20, the shaft 167 is provided with a worm 168 that meshes with a complementary wormwheel 169 carried by a shaft 170 which also carries the pinion 125 that meshes with the rack 126 on the quill 47. As shown in Fig. 19, the wormwheel 169 is rotatably mounted on the shaft 170 and is arranged to be operatively connected to it by means of a cone friction clutch mechanism 171 which may be engaged by tightening a nut 172 on the end of the shaft 170 projecting from the housing, the arrangement being such that the quill driving mechanism may be disengaged by loosening the nut 172 to free the quill for unrestrained vertical movement. This may be desirable under some circumstances, as for example when using the machine with a special spindle guiding attachment of the type disclosed and claimed in the co-pending application of Joseph B. Armitage and Howard W. Bartholomew filed August 31, 1939, Serial No. 292,758, which issued January 25, 1944, as Patent No. 2,340,210, entitled Milling machine.

To provide for moving the quill 47 manually, a bevel pinion 174 is keyed on the shaft 167, as shown in Figs. 19 and 20, in position to be engaged by a complementary bevel pinion 175 on the inner end of a stub shaft 176 journalled in the transmission housing wall and projecting therefrom to receive an actuating hand crank 177. With the reversing clutch spool 162 in neutral position, the quill 47 and the tool spindle 42 may be adjusted vertically by turning the hand crank 177, the position of the quill being indicated by a micrometer dial 178 adjustably secured to the shaft 176.

In order to control power feeding movement of the quill 47, trip mechanism is provided responsive to movement of the quill to predetermined positions delimiting its course of travel and operative to move the reversing clutch spool 162 to neutral position thereby disengaging the power driving mechanism. As appears in Figs. 5, 6 and 19, the quill 47 is provided with a projecting lug or tripping arm 180 having a squared portion arranged for sliding movement in a slot 181 in the side of the stationary sleeve 66, the arm being fastened at its inner end to the quill by means of screws 182. As best shown in Fig. 6, the tripping arm 180 is disposed to engage either of a pair of tripping dogs 183 and 184 that are adjustably positioned on a tripping member 185 slidably mounted for vertical movement on the side of the gear housing as indicated in Fig. 19.

When one or the other of the tripping dogs 183 or 184 is engaged by the tripping post 180, the slide 185 in moving imparts rocking motion to a crank arm 186 with which it is slidably engaged. The crank arm 186 is fixed on one end of a rock shaft 187 journalled on the side of the housing and carrying at its other end a cam member 188, as appears in Figs. 19 and 21. The cam member 188 engages one end of each of a pair of sliding members 189 and 190 mounted in the face of the housing and disposed to engage with their other ends a similar cam member 191 mounted on a rock shaft 192. As appears in Fig. 19, the rock shaft 192 is provided at its inner end with a crank member 193 that engages a groove 194 in the reverser shifting spool 162. The arrangement of the linkage is such that when the tripping mechanism is actuated by engagement of the tripping post 180 with either of the tripping dogs 183 or 184, the crank 193 is turned to the position shown in Figs. 19 and 22, thereby moving the clutch spool 162 out of engagement with the cooperating reversing pinion into the neutral position and disengaging the power drive to the quill. For reengaging the clutch spool 162 with one of the reversing pinions, the rock shaft 192 is provided at its outer end with an actuating handle 195 by means of which it may be turned to position the clutch spool in any one of its three positions as determined by a spring pressed detent mechanism 196 cooperating with detents in the cam 191.

The mechanism for turning the rotatable head 45 for establishing the angular position of the cross slide 46 to effect an angular cutting stroke, or for moving the cutter spindle 42 in a circular or arcuate cutting stroke, is shown generally in Figs. 1 and 5, and in detail diagrammatically in Fig. 17. As shown in Fig. 17, the actuating handwheel 49 at the front of the machine is carried on the projecting end of a driving shaft 200 which carries an adjustable worm 201 that meshes with complementary worm teeth 202 formed on the periphery of the rotatable head structure. As shown in Figs. 5 and 17, the shaft 200 extends rearwardly beyond the worm 201 to a reversing and disconnecting mechanism 203 including a pair of reversing bevel gears 204 and 205 rotatably mounted on the shaft 200 and adapted to be clutched to it selectively by means of a slidably keyed clutch spool 206. The reversing pinions 204 and 205 both mesh with a complementary pinion 207 fixed on a vertically positioned shaft 208 that is arranged to be driven at selected rate by means of a driving motor 209 and an interconnecting speed changing gear box 210.

As appears in Fig. 17, the shaft of the rotary head driving motor 209 is provided with a worm 212 disposed within the housing of the transmission mechanism 210 and having meshing engagement with a worm wheel 213 fixed on a splined shaft 214 journalled in the housing. Slidably mounted on the splined shaft 214 are two gear couplets 215 and 216 arranged to be meshed selectively with complementary gear wheels fixed on an intermediate shaft 217. A second splined shaft 218 is likewise provided with two slidably mounted gear couplets 219 and 220 that are also adapted to be meshed selectively with complementary gear wheels on the intermediate shaft 217. By this arrangement, the splined shaft 218 may be driven at any one of sixteen different speeds by suitably positioning the various shiftable couplets. As shown, the shaft 218 is provided with a spiral gear 221 which meshes with a complementary spiral gear 222 fixed on the lower end of the reverser driving shaft 208, the arrangement being such that by means of the rate changing gear box and the reverser mechanism 203, the rotary head 45 may be turned by power selectively in either direction at any one of sixteen speed rates.

The apparatus for positioning the shiftable gear couplets in the speed changing box 210 includes a rotatable cam shaft 223 associated with the couplets 215 and 216 and a similar cam shaft 224 associated with the couplets 219 and 220. Each of the cam shafts, as indicated with regard to the cam shaft 224 in Fig. 17, is provided with two circumferential cam grooves 225 each of which is engaged by a cam follower or pin 226 carried within a sleeve like shifting element 227 encircling and slidably mounted on the cam shaft, each sleeve element being provided with an extending cooperating shifting fork 228 that engages a shifting groove in the corresponding couplet in the usual manner. By this arrangement, each of the sleeves 227 may be moved longitudinally by engagement of the cam follower 226 with the cam groove 225 as the cam shaft is rotated, its longitudinal movement being properly guided by reason of its sliding engagement with the periphery of the cam shaft, whereby the usual auxiliary guide rod may be dispensed with.

The cam shafts 223 and 224 are provided at their outer ends with actuating crank handles 230 and 231, respectively, each having a locking pin which may be engaged in any one of four equally spaced locking holes 232 in the front of the gear box, as best shown in Fig. 5. The cam grooves are so arranged that only one couplet gear on each of the splined shafts 214 and 218 may be engaged with a cooperating gear on the intermediate shaft 217 at any one time. By positioning the two adjusting cranks 230 and 231 in accordance with a chart furnished, the rate changing gearing may be set in manner to provide any one of the sixteen available speed rates for revolving the spindle carrying rotatable head 45.

In machining an arcuate configuration upon a workpiece, it is sometimes desirable to turn the spindle carrying rotary head 45 back and forth through a predetermined arc of movement. To facilitate a machining operation of this type, the rotary head is provided with trip mechanism including a pair of trip dogs 235 adjustably positioned in a circumferential T slot 236 formed in the periphery of the head. As appears in Figs. 5 and 17, the trip dogs 235 are disposed to engage a tripping arm 237 that is pivotally mounted in the head supporting structure 43, the arrangement being such that upon the arm 237 being engaged by a dog 235 approaching from either direction, it is moved to the central neutral position shown in the drawings. As shown in Fig. 17, the tripping arm 237 operatively engages a control rod 239 which extends rearwardly from the region of the rotary head to the reversing mechanism 203, and is provided at its extended end with a shifting fork 240 that engages the shiftable reversing clutch spool 206, the arrangement being such that when the shifting arm 237 is in the central or neutral position the shifting fork 240 and the reversing clutch spool 206 are likewise in neutral position. Accordingly, whenever the arm 237 is engaged by one of the trip dogs 235 the reversing clutch spool 206 is moved out of engagement with the cooperating reversing pinion 204 or 205 and the power driving train to the rotary head, is thereby disengaged. Since the trip dogs 235 operate upon a circle ordinarily much greater in diameter than the circular path of the cutter, the position at which the cutter is to be stopped may be predetermined with a proportionately high degree of accuracy.

To reengage the head driving train, the tripping arm 237 and its associated linkage may be turned by means of an upwardly extending hand lever 241 mounted at the side of the machine head and which may be moved manually to position the reversing clutch spool 206 in any one of its three operating positions, as determined by three detent notches in the arm 237 that are engaged by a spring pressed detent plunger 242. In order to prevent the handwheel 49 from accidentally being turned by the power driving mechanism and thus endangering the operator, the handwheel is slidably mounted on the end of the shaft 200 and is provided with clutch teeth 245 which may be engaged with complementary clutch teeth 246 of a clutch member fixed on the shaft. To insure disengagement of the hand wheel clutch teeth 245 from the shaft clutch teeth 246 when the power driving mechanism is engaged, the tripping arm 237 is arranged to engage the end of a control rod 247 that is slidably mounted parallel with the shaft 200, as shown in Fig. 17. The tripping arm 237 cooperates with the control rod 247 in such manner that when the arm is moved in either direction from neutral position to an engaged position, the control rod 247 is moved outwardly and a fork 248 thereon, which engages a groove 249 in the handwheel 49, moves the handwheel outwardly to disengage the clutch teeth. Furthermore, the arrangement is such that the clutch cannot be reengaged until the tripping arm 237 is again moved to the neutral position shown, whereupon the arm presents a notch 250 disposed to receive the end of the control rod 247 in manner to permit inward clutch engaging movement of the handwheel. Lubricant for the head driving mechanism is supplied by means of an oil reservoir 253, shown in Fig. 5.

When it is desired to set the rotary head 45 at a predetermined angle for performing an angular cutting operation by transverse movement of the slide 46, the head drive control lever 241 is moved to neutral position and the handwheel 49 is engaged to turn the shaft 200 and the worm 201 manually, the position of the head being ascertained from the angle scale 59 supplemented by the micrometer dial 60, as previously explained. The head may then be clamped in the adjusted position by tightening a pair of clamping screws 251 which project downward from the lower surface of the head at diametrically opposed positions, as appears in Figs. 2, 3, 5 and 18. As shown in detail in Fig. 3, the clamping screws 251 bear against the lower side of a clamping ring 252 disposed circumferentially of the head, as indicated in Fig. 10, the screws forcing the ring upward into frictional engagement with the lower surface of the supporting structure 43.

With the head thus clamped, the cross slide 46 may be moved along the predetermined angular path by turning the hand crank 53, thereby turning the actuating screw 55 in engagement with a cooperating nut 255. As shown in Fig. 18, the nut 255 is removably fastened to the slide 46 by screws 256 in such manner that it may be released to free the slide for unrestrained cross movement.

If it is desired to retain the slide 46 rigidly in predetermined position in the head 45 for the purpose of effecting an arcuate or circular cutting operation by rotating the head, the slide 46 is first accurately adjusted radially by reference to the scale 56 and the dial 57, as previously explained, to position the spindle 42 at the desired radial distance from the center of the head. The slide 46 may then be clamped rigidly to the head by tightening a clamping spanner nut 258 that is threaded on the lower end of the non-rotating sleeve 66, the arrangement being such that when the nut is tightened it draws downward upon the sleeve and exerts force upward upon a depending cylindrical portion 259 of the cross slide structure that encircles the sleeve, as shown in Fig. 10. This causes the upper end of the sleeve 66 to exert force downward upon the top of the head 45 and forces the cross slide upward into frictional clamping engagement with the lower surface of the rotary head. The depending cylindrical portion 259 of the cross slide is accurately finished on its exterior in manner to present a true surface for receiving any of various attachments which may be utilized in connection with the machine, such as the attachment previously referred to as disclosed in the previously mentioned Patent No. 2,340,210. For retaining the vertically movable quill 47 in predetermined position after it has been adjusted by manipulating the hand crank 177, the lower end of the sleeve 66 is slotted and is threaded to receive a clamping spanner nut 262 generally similar to the slide clamping nut 258, the arrangement being such that when the nut 262 is tightened, the slotted end of the sleeve 66 is contracted into clamping engagement with the exterior of the quill 47 to retain it rigidly in adjusted position.

The work supporting structure comprising the knee 33, the saddle 35 and the table 37, is constructed to support the workpiece 39 in such manner that it may be positioned relative to the tool spindle 42 with a high degree of precision. As appears in Fig. 2, the approximate vertical position of the knee 33 may be established by means of an indicator 264 adjustably positioned on the side of the column 30, and accurate vertical positioning of the knee may be effected by referring to a micrometer dial 265 associated with the knee elevating handwheel 34. After the adjustment has been effected, a clamping mechanism operated by a clamping lever 266, may be actuated for clamping the knee to the column in its adjusted position.

To provide for guiding the saddle 35 accurately in traversing movements along the knee 33, a relatively long and narrow guideway 270 is formed for it on the top of knee, as shown in Figs. 1, 5 and 7. In order that the guideway may be of maximum length, there is provided on the rear of the knee structure an extension member 272, in this instance constituted by a bracket bolted to the knee, although the extension might be formed integrally with the knee casting. As shown in Figs. 5 and 7, the extension element 272 is shaped to constitute an integral part of the guideway 270 and it is disposed to project rearwardly into a vertically extending recess 273 formed in the forward face of the column 30 between the guideways 31 and 32 and of such dimensions as to permit unrestricted movement of the extension 272 therein when the knee is adjusted vertically. The saddle 35 is likewise provided with a complementary rearwardly extending member 274 which is adapted to slidably engage the knee extension 272 when the saddle is moved to its rearward position adjacent to the column face. By this arrangement, the length of the guiding bearing surfaces between the saddle and the knee is materially increased, thereby reducing the likelihood of canting or turning movement of the saddle relative to the knee and increasing the accuracy of its relationship with the knee.

The approximate position of the saddle relative to the knee may be determined by means of a scale 276 mounted on the side of the knee and cooperating with an indicating pointer 277 adjustably mounted on the saddle, as shown in Fig. 2. More accurate indication of the saddle position may be obtained from a micrometer dial 278 associated with the handwheel 36 for moving the saddle. For establishing the transverse position of the saddle with a high degree of precision, there is provided a dial indicator 280 mounted on the knee and functioning in cooperation with measuring rods 281 carried by the knee, as shown in Fig. 7, the rods being arranged to be engaged by a suitable abutment on the saddle, whereby the indicator 280 may be actuated in well known manner to establish the position of the saddle. After the saddle 35 has been accurately positioned, it may be clamped to the knee 33 by means of a clamping mechanism actuated by a clamping lever 282.

As shown in Figs. 1 and 7, the saddle 35 presents a relatively long upper bearing surface for receiving the work supporting table 37, the arrangement being such that the table is at all times supported throughout its entire length upon the bearing surface, the table being relatively short and so arranged that it does not overhang either end of the saddle at any time. Although in this embodiment of the invention the table 37 is shown supported upon a knee and saddle structure, it is to be understood that the table might alternatively be supported upon a fixed structure such as is utilized in a machine of the bed type.

The approximate position of the table 37 relative to the saddle 35 may be ascertained by reference to a scale 284 fixed on the front of the saddle as shown in Fig. 1 and cooperating with an adjustable pointer element 285 carried by the table. More accurate indication of the table position may be ascertain from a micrometer dial 286 associated with the table actuating hand wheel 38. For precisely positioning the table, there is provided a dial indicator 287 arranged to cooperate with indicating rods 288 carried by the saddle and disposed to be engaged by an abutment mounted on the table, as shown in Fig. 7. When contacted by the abutment the rods are moved into engagement with the indicator 287 for actuating it in well known manner. To retain the table in adjusted position, it may be clamped to the saddle by actuating a clamping lever 289. The various guiding and supporting surfaces of the relatively movable work supporting elements, and the screw and nut mechanisms for moving them are precisely fitted in manner to obviate all looseness and backlash.

Longitudinal feeding movement of the work supporting table 37 may be effected by power derived from a feed driving motor 292 that actuates a rate changing transmission gear mechanism 293 which is similar in construction and operation to the gear changing mechanism 210 for driving the rotary head 45. As best shown in Fig. 1, both the motor 292 and the gear box 293 are mounted beneath the right end of the saddle 35, the transmission mechanism being connected to the table screw by means of reversing and disconnecting gearing. The reverse gearing may be actuated by a control lever 294 extending at the front of the machine, the arrangement being such that the table may be driven in either direction selectively and at any one of sixteen speeds as determined by the setting of control levers 295 and 296 on the gear box 293.

The table reversing and disconnecting lever 294 has connected to it a longitudinally disposed tripping rod 297 carrying a pair of adjustably mounted tripping dogs 298 disposed to be engaged by a tripping arm 299 fixed on the table 37, the arrangement being such that when the table arrives at either of predetermined terminal positions in its course of travel, one of the tripping dogs 298 will be engaged by the arm 299 and will function to move the disconnecting lever 294 and the reverse gearing to neutral position, thereby stopping the table. It is to be understood that the motor 292 and gear box 293 can also be connected readily to drive the saddle actuating screw selectively, or that another similar motor and gear box could be provided for the purpose of driving the saddle screw independently. As shown in Fig. 1, the table driving mechanism may also be utilized to actuate an attachment mounted on the table 37, for instance, a rotary table 301 that is operatively connected by a drive shaft 302 to the transmission mechanism.

The rotary table 301 may also be turned manually in the usual manner by actuating a handwheel 303 extending at the front thereof. Further, the handwheel 303 may be replaced by an indexing crank and a cooperating indexing plate in known manner to provide for effecting precise angular positioning of the rotary table 301 in performing indexing operations on the machine. Likewise, the handwheel 49 by means of which the rotary head 45 is actuated manually, may be replaced by a similar indexing crank and a cooperating indexing plate for the purpose of indexing the rotary head to provide for successively positioning the spindle 42 by precisely predetermined angular increments.

Each of the several micrometer dials associated with the various manually actuated positioning devices for the movable elements of the machine, is arranged to be released readily for turning it relative to its associated adjusting member in order that it may be set at an initial position from which measuring movement of the machine element may be effected. As shown in detail in Fig. 8, with respect to the micrometer dial 278 associated with the saddle cross feeding mechanism, the dial is arranged to be clamped in fixed position relative to the cross feeding screw by means of a locking screw 305 which extends to the front of the associated handwheel 36 concentric therewith and is provided at its forward or outer end with a knurled actuating knob 306 that is readily accessible for clamping or unclamping the dial. As shown, the screw 305 is threaded in the actuating shaft which carries the handwheel 36 and is provided at its inner end with a tapered or conical portion disposed between and acting upon a plurality of equally spaced clamping balls 307. When the locking screw 305 is turned by the knob 306 in manner to move it inwardly, the conical end portion exerts outward pressure upon the balls 307 forcing them against a slotted clamping sleeve 308 that is pinned to the shaft of the saddle screw, thereby expanding it into frictional clamping engagement with the inner surface of the hub portion of the indicating dial 278. By this arrangement, the dial may be released from the traversing screw readily by turning the knob 306 to withdraw the locking screw 305, whereupon the dial 278 may be turned to the desired position after which it may again be clamped to the shaft by turning the knob 306 to tighten the locking screw 305.

In machining a surface to a predetermined contour on the workpiece 39, for example to form a slot or groove in or through the workpiece such as to constitute an extrusion die having a configured opening 310, as indicated in Fig. 7, the work supporting table and the spindle carrying head are moved in coordinated, accurately controlled relationship. Preferably, the spindle 42 is first set at the center of the rotary head and the table and saddle are moved to so position the workpiece 39 that the spindle axis coincides with a point 311 selected to constitute the center of an arcuate portion 312 of the slot. The rotary head may then be turned to position the slide 46 transversely of the work table 37 and the slide moved relative to the head to position the spindle 42 at a distance from the center of rotation of the head 45 equal to the radius of the arcuate portion 312 and at the point coinciding with one end thereof. The cutter 44 may then be fed downward into the workpiece 39 to the desired depth by actuating the quill feeding hand crank 177 to establish the depth of cut. A trip dog 235 may be positioned in the T slot 236 of the rotary head at a point to stop the head just prior to completion of the arcuate portion 312, and power rotation of the head may then be started by actuating the reverser engaging lever 241, whereupon the cutter 44 will be fed along the arcuate path 312 until power movement of the head is stopped by engagement of the tripping dog 235 with the tripping arm 237. Further movement of the rotary head 45 may be effected manually by turning the hand wheel 49 until the arcuate cut has been completed throughout an accurately predetermined angle, as indicated by the scale 59 and the micrometer dial 60.

After the arcuate cut has been completed, the cutter may be withdrawn by actuating the quill adjusting crank 177, after which the rotary head 45 may be turned to a position in which the slide 46 is disposed to move along a path at the angle corresponding to the angle in which the straight portion 313 of the slot is to be formed. The saddle and table are then adjusted to move the workpiece in such manner that the cutter will again enter the slot at the end of the arcuate portion 312. With the cutter reentered in the slot, the dial 57 on the slide actuating screw 55 may be set to zero position and the slide advanced by turning the slide actuating hand crank 53 until the cutter has moved along the angular portion 313 through the desired distance, as indicated by the dial reading. The dial 286 associated with the table moving mechanism may then be set to zero position after which the table is moved to the left, either manually or by power under the control of its trip mechanism, in manner to form the longitudinal portion 314 of the slot, the movement being continued until the dial 286 indicates that the longitudinal portion has been cut to the predetermined length. The dial 278 associated with the saddle traversing mechanism may then be set at zero position and the saddle moved in forward direction the necessary distance, as indicated by the dial to form the transverse portion 315 of the slot.

When the straight portions of the slot have been completed, the cutter is again withdrawn from the workpiece and the cross slide 46 is positioned in the head 45 to place the cutter at the distance from the center of rotation of the head corresponding to the radius of another arcuate portion 316 of the slot. The rotary head is then turned to position the cutter at the left of the center of the head and the table and saddle are then moved to position the workpiece for reengagement of the cutter with the end of the transverse portion 315 of the slot. The trip dog 235 on the rotary head may again be set at the required position and the rotary head driving mechanism may be started to feed the cutter around the arcuate element 316 until the head is stopped automatically, whereupon the slot may be completed to the predetermined angular position by manually actuating the head turning hand wheel 49 as previously explained.

In forming multiple dies or the like in which a plurality of duplicate configurations are arranged in either angular or rectilinear spaced relationship, the work may be expedited and accurate duplication facilitated by forming each element of the several configurations successively at the spaced positions. If the configurations are to be angularly spaced, the workpiece is mounted on the rotary table 301, and after the rotary head has been adjusted to effect, for example, an arcuate cut of predetermined radius, the table may be indexed in manner to present the various positions upon the workpiece to the cutter and the several arcuate cuts made successively. After the arcuate elements have all been formed, the rotary head may be reset and the work table again indexed to effect successive formation of another element, for instance a straight line portion of the configuration, the indexing being repeated until all elements of the configurations have been formed. If the repeated configurations are to be arranged rectilineally, the workpiece may be moved in like manner to the successive positions by appropriately moving the table and saddle in accordance with the indications of the asscociated measuring instruments.

In the event that the configuration being machined includes a part having parallel sides such as a rectangular element, disposed parallel with the direction of movement of the table, the part may be machined most readily by use of the rotary head for positioning the tool at the opposite sides of the rectangle. For this purpose, the spindle 42 is set at the radial position equal to one half of the width of the rectangle. One side of the rectangle is machined by feeding the table or saddle as the case may be, and then the spindle carrying head is turned through one-half of the revolution to position the cutter for machining the other side of the rectangle. After the sides of the rectangle are finished, the head may then be turned one-quarter of a revolution and reset to machine the ends in like manner. For highly accurate work, trial cuts may be taken on both sides of the rectangle and the position of the spindle in the head adjusted in accordance with measurements taken upon the workpiece. After the spindle has been accurately adjusted in this manner, a series of parallel cuts may be made by shifting the workpiece as previously explained. Under some circumstances a grinding wheel may be substituted for the milling cutter for grinding the opposite sides of rectangular pieces or for performing other work.

In performing various machining operations upon the improved milling machine constructed in accordance with this invention, it is sometimes desirable to apply cutter cooling liquid or coolant to the milling cutter, and at other times it is desirable that a blast of air be applied to the workpiece in the region of the cutting operation in order to remove chips to provide for better observation of the progress of the work. Further, under some circumstances it may be desirable to apply a mixture of air and liquid to the cutter and the workpiece. For this purpose, the machine is provided with a coolant liquid pump 320 mounted in the base of the machine and operated by a motor 321, and disposed adjacent to the coolant pump on the side of the column is an air pump 322 similarly operated by a motor 323. As shown in Fig. 2, the coolant pump 320 and the air pump 322 are connected respectively by means of conduits 324 and 325 to a mixing or junction chamber or conduit 326, shown enlarged in Fig. 4, from which a single conduit leads to the region of the cutter.

Since the cutter supporting spindle 42 is arranged to be moved along angular or arcuate paths relative to the machine frame, it is necessary that the conduit for delivering the cutter coolant be arranged to follow the movements of the cutter. For this purpose, the coolant conduit is provided with a readily directable delivery nozzle 328 that is supported by means of a collar 329 disposed concentric with the spindle 42 and rotatably mounted upon a collar 330 which is secured to the cylindrical portion 259 depending from the cross slide 46, the arrangement being such that the nozzle 328 may follow the gyratory movement of the spindle. For conveying the coolant fluid to the nozzle, there is provided a horizontally disposed tubular member 331 which is pivotally supported at its forward end upon the rotatable collar 329 and is slidably mounted near its other end in a guide member 332 that is pivotally mounted for universal swiveling movement on the side of the column 30, the arrangement being such that the tube 331 may move longitudinally and angularly in following the movement of the cutter spindle. The connection from the valve chamber 326 on the side of the column to the rearward end of the tube 331 is effected by means of a flexible conduit 333.

In order to prevent the coolant liquid from being forced into the air pump 322 when the pump motor 323 is not operating, the valve chamber 326 is provided with a ball valve or check 335 that closes the inlet to the chamber from the air conduit 325, as shown in Fig. 4. Likewise, the liquid pump 320 is provided with a check valve 336 which in similar manner prevents the air from escaping through the liquid pump when the latter is not operating. For regulating the rate of flow of the coolant liquid, as may be desirable when a mixture of coolant liquid and air is utilized, an adjustable regulating or proportioning valve 337 is provided in the coolant liquid supply conduit 324 adjacent to the valve chamber 326.

The coolant pump and air pump motors 321 and 322 may be controlled by means of switches 341 and 342, respectively, mounted on the front of the machine head structure 43. As shown in Fig. 1, the switches 341 and 342 are mounted in a control panel 343 at the front of the head, which also carries a switch 344 for starting or stopping the rotary head driving motor 209 and a reversing switch 345 arranged to energize the spindle driving motor 63 for rotation in either direction selectively. A separate switch 346 is provided on the right end of the saddle 35, as shown in Figs. 1, 5 and 7, for starting and stopping the table driving motor 292. Electric power for energizing the various motors and for supplying lights which may be applied to the dial indicating devices 280 and 287 or disposed to illuminate the workpiece and cutter, is brought into the machine through a master control switch 348 that is mounted in a housing 349 formed in the left side of the column, as shown in Figs. 2 and 7. By this arrangement, the machine operator may completely disconnect the power source from the machine after he has finished using it, by opening the main switch 348, thereby deenergizing all of the various motors and lighting units, the switch being so arranged that it may be locked in open position to prevent unauthorized energization of any electrical part of the machine.

From the foregoing description and explanation of the operation of the disclosed embodiment of this invention, it is apparent that there has been provided an improved, highly versatile machine tool capable of being manipulated in manner to effect cutting strokes of intricate and precise character in accordance with specified dimensions.

Although a single embodiment of the invention has been described in considerable detail for the purpose of fully disclosing a practical, operative exemplary apparatus, it is to be understood that the apparatus herein described is intended to be illustrative only, and that the various inventive features thereof may be incorporated in other structural forms without departing from the spirit and scope of the invention as defined in the subjoined claims:

The principles of the invention having now been fully explained in connection with the foregoing description of the illustrative embodying apparatus, the invention is hereby claimed as follows:

1. A milling machine comprising a frame, a work supporting table slidably mounted on said frame for movement in a horizontal plane, a tool supporting head rotatably mounted in said frame above said table, a transverse slide carried by said head for movement radially thereof, a spindle carrying quill slidably mounted in said slide for vertical axial movement toward or from said table, a tool carrying spindle rotatably mounted in said quill, means mounted on said frame and operatively connected to turn said head for imparting gyratory movement to said spindle, power driving means mounted on said frame, means supporting said power driving means for movement independently of said rotatable head, and a transmission mechanism connecting said power driving means to rotate said spindle for driving a tool supported thereby, whereby the tool in said spindle may be rotated while being moved through circular or arcuate cutting strokes of predetermined radii at different predetermined positions on a workpiece carried by said table.

2. In a machine tool, the combination with a frame, of a rotatable tool carrying head mounted in said frame, a tool slide carried by said head and arranged for radial movement relative thereto, a tool spindle rotatably mounted in said tool slide, power driven means mounted in said frame and operatively connected to rotate said tool carrying head, power driven means mounted in said frame, means supporting said power driven means for movement in said frame independently of said rotatable head, and power transmitting means operatively connected to transmit power from said power driven means to said rotatable head to rotate said tool spindle.

3. A machine tool comprising a frame, a work holding member movably mounted on said frame, a spindle supporting quill mounted for axial and gyratory bodily movement relative to said frame in cooperating relationship with said work holding member, a tool carrying spindle rotatably mounted in said quill, power driven means mounted in said frame, means supporting said power driven means for movement independently of said quill, and transmission means operatively connected between said power driven means and said rotatable spindle to drive said spindle.

4. In a machine tool, the combination with a frame, a tool supporting head rotatably mounted in said frame, a tool spindle eccentrically disposed in said rotatable supporting head, means for rotating said head to cause gyratory movement of said spindle, a connecting rod structure rotatably connected at one end to said rotary head concentric with said spindle and slidably mounted at its other end in said frame, and a source of power carried by said connecting rod structure and operatively connected to drive said spindle.

5. In a machine tool, the combination with a cutting tool, of coolant supplying means for said tool including a coolant delivery nozzle, a coolant liquid pump operatively connected to supply coolant liquid to said nozzle, an air pump connected to supply air to said nozzle, and automatically operating valve means arranged to prevent liquid from flowing from said liquid pump into said air pump.

6. In a machine tool, a frame, a spindle carrying head rotatably mounted in said frame, a cross slide mounted for radial movement in said head, a quill slidably mounted for axial movement in said cross slide, a tool spindle rotatably mounted in said quill, power driven means operatively connected to drive said tool spindle regardless of the position assumed by said quill, and means for driving said quill in axial feeding movements including speed changing and reversing mechanism carried by said cross slide and operatively connected to be driven by said tool spindle.

7. A machine tool comprising a frame, a spindle supporting head rotatably mounted in said frame, a cross slide mounted for radial movement in said head, a spindle carrying quill mounted for axial sliding movement in said cross slide, a spindle rotatably mounted in said quill, means for driving said spindle, and means driven by said spindle and operatively connected to feed said quill in axial direction at predetermined rate.

8. In a machine tool, a rotary head, a spindle supporting sleeve mounted in said head parallel with the axis of rotation thereof and arranged for radial adjustment relative thereto, a spindle driving member journalled on said sleeve concentric therewith, means for driving said member, a quill element slidably mounted for axial movement within said sleeve, means for moving said quill, a tool carrying spindle journalled in said quill for axial movement therewith and having sliding driving connection with said driving member for rotation thereby, and means carried by said sleeve and operative to transmit power from said spindle to said quill moving means for effecting power axial feeding movement of said spindle.

9. In a machine tool, a rotatable supporting head, a cross slide carried by said head, means to adjust the position of said cross slide radially of said head, a quill slidably mounted in said cross slide for axial movement relative thereto, a spindle rotatably mounted in said quill, power actuated means operatively connected to turn said head for revolving said spindle bodily along a circular path of movement, power actuated means operatively connected to rotate said spindle irrespective of its bodily movement, and power actuated means operatively connected to effect axial movement of said quill while said spindle is rotating and while said head is turning, whereby said spindle may be given an axial feeding movement while it is rotating and while it is being revolved bodily in a circular path.

10. In a machine tool, a frame, work supporting means carried by said frame, a rotatable spindle supporting head journalled on said frame in cooperating relationship with said work supporting means, a transverse spindle supporting slide mounted for radial movement in said rotatable head, an axially movable spindle supporting quill carried by said transverse slide, means to drive said rotatable head for moving said quill in a circular path, a tool carrying spindle rotatably mounted in said quill and bodily movable therewith, means to drive said spindle to rotate a cutting tool carried thereby while it is being moved bodily with said head, and means to drive said quill to effect a longitudinal feeding movement, the arrangement being such that a rotary cutting tool carried by said spindle may be revolved bodily along a circular path while being rotated to effect a cutting action and simultaneously fed axially into a workpiece on said work supporting means.

11. A machine tool comprising a frame, a work holding member movably mounted on said frame, a spindle supporting quill mounted for axial and gyratory bodily movement relative to said frame in cooperating relationship with said work holding member, a tool carrying spindle rotatably mounted in said quill, power driven means operatively connected to drive said spindle for rotating a tool carried thereby, and means driven by said spindle for driving said quill to effect axial feeding movement of said tool.

12. A milling machine comprising a frame, a work supporting table slidably mounted on said frame for movement in a horizontal plane, a tool supporting head rotatably mounted in said frame above said table, a transverse slide carried by said head for movement radially thereof, a spindle carrying quill slidably mounted in said slide for vertical axial movement toward or from said table, a tool carrying spindle rotatably mounted in said quill, means mounted on said frame and operatively connected to turn said head for imparting gyratory movement to said spindle, power driven means operatively connected to rotate said spindle for driving a tool supported thereby, and power driven means operatively connected to effect axial feeding movement of said quill, whereby a tool in said spindle may be moved through circular or arcuate cutting strokes of predetermined radius at predetermined positions on a workpiece carried by said table while the tool is being rotated to effect a cutting operation and is simultaneously being fed axially into the workpiece.

13. In a machine tool, a rotary head, a spindle supporting sleeve mounted in said head parallel with the axis of rotation thereof and arranged for radial adjustment relative thereto, a spindle driving member journalled on said sleeve concentric therewith, means for driving said member, a quill element slidably mounted for axial movement within said sleeve, means for imparting axial movement to said quill, a tool carrying spindle journalled in said quill for axial movement therewith and having sliding driving connection with said spindle driving member for rotation thereby, means operatively connected to turn said rotary head for imparting gyratory movement to said spindle, and means carried by said supporting sleeve and operative to transmit power from said spindle to said quill moving means for effecting power axial feeding movement of said spindle while it is gyrating.

14. In a machine tool, a frame, a spindle carrying head rotatably mounted in said frame, a cross slide mounted for radial movement in said head, a quill slidably mounted for axial movement in said cross slide, a tool spindle rotatably mounted in said quill, power driven means operatively connected to drive said tool spindle regardless of the position assumed by said quill, means for driving said rotatable head to revolve said tool spindle in a circular path of cutting movement, and means for driving said quill in axial feeding movement including speed changing and reversing mechanism carried by said cross slide and operatively connected to be driven by said tool spindle.

15. A machine tool comprising a frame, a spindle supporting head rotatably mounted in said frame, a cross slide mounted for radial movement in said head, a spindle carrying quill mounted for axial sliding movement in said cross slide, a spindle rotatably mounted in said quill, means for rotating said spindle head to revolve said spindle along a circular path of bodily movement, means for driving said spindle in rotary movement, and means driven by said spindle and operatively connected to feed said quill in axial direction at predetermined rate.

16. In a machine tool having a frame, a rotary tool spindle mounted for gyratory movement in said frame, a supporting structure comprising a first plate pivotally mounted at one end concentric with said tool spindle, an intermediate plate slidably connected to said first plate, a third plate slidably connected to said intermediate plate and pivotally mounted at one end upon another element of said machine tool, a pulley carried by each of said plates, means operatively connecting said pulley on said first plate to drive said spindle, belts interconnecting said pulleys, means to move said plates relative to each other to tighten said belts upon said pulleys, and a single clamping device disposed to clamp said three plates together to retain said belts in tightened condition.

17. In a machine tool, a rotatable tool carrying spindle mounted for gyratory and axial bodily feeding movements, power driven means operatively connected to effect continuous gyration of said spindle, power driven means operative to effect rotation of said spindle about its own axis while it is gyrating and means driven by said spindle and operative to effect axial feeding movement of said spindle while it is being gyrated and rotated, whereby a rotary cutting tool carried by said spindle may be caused to follow a helical path.

18. In a machine tool, a frame, a rotatable tool spindle mounted in said frame in manner to be gyrated bodily about a fixed axis eccentric to its own, means for driving said spindle about its own axis, said means including a belt pulley on said spindle, a driving belt pulley mounted in said frame independently of the gyratory mounting of said spindle, means supporting said pulley for movement relative to said frame, a driving belt disposed to transmit power from said driving pulley to said gyratory spindle pulley, and means to maintain the distance between said spindle pulley and said driving pulley constant regardless of the position assumed by said spindle in its gyratory movements.

19. In a machine tool, a spindle supporting structure comprising a frame, a vertically disposed spindle carrying quill slidably mounted in said frame, a spindle disposed within said quill, a pair of preloaded antifriction bearings arranged to support said spindle rigidly at its forward lower end within said quill for axial bodily movement therewith, another antifriction bearing disposed to support said spindle at the upper end of said quill, a coil spring disposed concentric with said spindle and operatively connected to exert force upward upon said upper antifriction bearing to counterbalance the weight of the spindle for assisting upward movement thereof, a driving sleeve for rotating said spindle, a pair of antifriction bearings disposed to rotatably support said driving sleeve in said frame in axial alignment with said spindle, and means arranged to effect a sliding connection between said spindle and said driving sleeve, whereby axial movement of said spindle with said quill may be effected without disturbing the driving connection between said sleeve and said spindle.

20. In a machine tool, a spindle supporting structure comprising a frame, a spindle carrying quill disposed in vertical position and slidably mounted in said frame for vertical axial adjustment relative thereto, a spindle rotatably mounted in said quill, means for driving said spindle, means operatively connected to effect axial adjustment of said quill relative to said frame, and a coil spring disposed concentric with said spindle and operatively connected to exert force upward upon said quill to counterbalance the weight thereof for assisting upward adjustment of said spindle.

21. In a machine tool, the combination with a cutting tool, of coolant supplying means for said tool including a coolant delivery nozzle, a coolant liquid pump operatively connected to supply coolant liquid to said nozzle, an air pump connected to supply air to said nozzle, and automatically operating valve means arranged to prevent the escape of air from said air pump through said liquid pump.

22. In a machine tool having a frame, a rotary tool spindle mounted for universal transverse movement in said frame, a supporting structure comprising a first plate pivotally mounted at one end concentric with said tool spindle, an intermediate plate slidably connected to said first plate, a third plate slidably connected to said intermediate plate and movably mounted at one end upon said frame, a pulley carried by each of said plates, means operatively connecting the pulley on said first plate to drive said spindle, power actuated means connected to drive the pulley on said third plate, belts interconnecting said pulleys, and means to move said plates relative to each other to adjust said pulleys to said belts.

23. In a machine tool having a base, a tool spindle movably mounted on said base for displacement in a plurality of directions, a belt pulley disposed concentrically of said spindle, a flat plate pivotally mounted concentrically of said spindle in manner to move with it, a second flat plate slidably mounted on said first flat plate, an intermediate pulley mounted on said second flat plate, a third flat plate slidably mounted on said second flat plate, a driving pulley arranged to be moved by said third flat plate, belts interconnecting said pulleys for driving said spindle, and means to clamp said plates together to hold said belts in predetermined driving position, whereby said plates and said driving pulley may move with said spindle as a unit to maintain the predetermined driving connection.

24. In a machine tool, a frame, a spindle carrying structure mounted on said frame for movement relative to it, a spindle rotatably mounted in said spindle carrying structure, a belt pulley operatively connected to drive said spindle, a strut connected to move with said spindle driving pulley, a second strut slidably connected with said first strut, a belt pulley on said second strut, a belt interconnecting said spindle driving pulley and said strut mounted pulley, a third strut slidably connected with said second strut, a power operated pulley, means connecting said third strut to move said power operated pulley, a belt interconnecting said strut mounted pulley and said power operated pulley, and means to clamp said struts together to hold said belts in proper operating tension, whereby said spindle may be moved relative to said frame while maintaining belted connection with said power operated pulley.

25. In a milling machine, a frame, a work table carried by said frame, a rotatable cutter spindle support movably mounted on said frame, a rotatable cutter spindle, a driving motor for rotating said spindle, means for slidably mounting said rotatable spindle upon said rotatable support for lateral adjustment with respect to its center of rotation, means for rotating said spindle support to move said spindle in an arcuate path, means for slidably mounting said driving motor in said frame, connecting linkage arranged to maintain the distance between said spindle and said motor constant, and power transmitting means connected to transmit power from said motor to said spindle.

26. In a machine tool, the combination with a frame, a tool supporting head movably mounted in said frame, a tool spindle rotatably mounted in said head, a connecting rod structure connected at one end to said head and slidably mounted at its other end in said frame, a source of power carried by said connecting rod structure, a belt drive including an expansible pulley operatively connecting said power source to said spindle to drive it, a contact member disposed to engage said pulley and arranged to move with it, and a speed indicating arm operatively connected to be moved by said contact member in manner to indicate the driving speed.

27. In a machine tool having a work supporting element and a cutting tool disposed to cooperate with said work supporting element, a coolant system arranged to direct coolant onto said cutting tool, a mixing conduit connected to supply coolant to said coolant system, a source of air pressure connected to supply air to said mixing conduit, a source of coolant liquid connected to supply liquid to said mixing conduit, and a regulating valve associated with said coolant liquid source and operative to regulate the amount of liquid admitted to said mixing conduit to thereby adjust the proportion in which the air and the liquid is supplied to said coolant system.

28. In a machine tool, a frame, a cutter supported by said frame, a coolant liquid source, a source of air pressure, and mixing apparatus including a proportioning valve arranged to receive coolant liquid and air from said sources and operating to mix them in predetermined proportion, whereby a connected coolant system may receive mixed liquid and air from said mixing apparatus and deliver it to said cutter.

29. In a machine tool, a frame, a rotatable tool spindle mounted for universal transverse bodily movement in said frame, a spindle drive mechanism comprising a supporting structure including a first strut pivotally mounted at one end concentric with said movably mounted tool spindle, a second strut slidably connected to said first strut, a third strut slidably connected to said second strut and movably supported on said frame, a pulley carried by each of said struts, means operatively connecting the pulley on said first strut to drive said spindle, power actuated means connected to drive the pulley on said third strut, belts interconnecting said three pulleys to transmit power from said power actuated means to said movable tool spindle, and means to effect sliding movement of said struts relative to each other to adjust said belts.

30. In a machine tool, a frame, a spindle carrying structure movably mounted in said frame, a spindle rotatably mounted in said movable spindle carrying structure, a cone belt pulley operatively connected to drive said spindle, a strut connected to move with said spindle driving cone pulley, a second strut slidably connected to said first strut, a complementary cone pulley carried by said second strut, a belt interconnecting said cone pulleys, means for effecting sliding movement of said struts to tighten said belt, a single pulley operatively connected to said strut mounted cone pulley, a third strut slidably connected to said second strut, an expansible pulley complementary to said single pulley and carried by said third strut, a belt interconnecting said single pulley and said expansible pulley, means for effecting sliding movement of said second and third struts to adjust the driving ratio of said expansible pulley, and power operated means slidably mounted on said frame for movement with said third strut and operatively connected to drive said expansible pulley.

JOSEPH B. ARMITAGE.